Patented June 4, 1940

2,203,009

UNITED STATES PATENT OFFICE 2,203,009

MANUFACTURE OF N-TERTIARY AMINO ACYCLIC CARBOXYLIC ACIDS AND THEIR SALTS

William Stansfield Calcott, Woodstown, Louis Spiegler, Woodbury, and John Marlin Tinker, Carneys Point, N. J., assignors to E. I. du Pont de Nemours & Company, Wilmington, Del., a corporation of Delaware No Drawing. Application August 26, 1937, Serial No. 161,022

14 Claims. (Cl. 260—534)

This invention relates to the production of N-tertiary amino acyclic carboxylic acids of the general formula:

in which R, A, and A' represent hydrogen or alkyl radicals having from 1 to 20 carbon atoms, R' and R" are alkyl groups containing from 1 to 5 carbon atoms, and $n$ denotes 0, 1, or 2. More particularly, this invention relates to the process of preparing the above-described tertiary amino carboxylic acids through the condensation of (a) anhydrous aliphatic amines of the type

(where R' and R" represent alkyl radicals of the formula $C_nH_{2n+1}$; i. e., $CH_3$, $C_2H_5$, $C_3H_7$, etc., in which $n$ stands for a number not greater than 5) in the presence or absence of a tertiary aliphatic amine of the type:

where R', R", and R''' are alkyl radicals of the formula $C_nH_{2n+1}$ in which $n$ is a number not greater than 4, with (b) halogen substituted acyclic carboxylic acids of the general formula:

wherein X stands for a halogen atom, R, A, and A' are hydrogen or alkyl radicals having from 1 to 20 carbon atoms, and $n$ denotes 0, 1, or 2.

This invention also relates to a process of preparing the above-described N-dialkyl amino carboxylic acids from a mixture of a dialkyl amine and a trialkyl amine by condensation with a halogen substituted acyclic carboxylic acid (as indicated above) in such a manner as to separate the trialkyl amine from the dialkyl amine in essentially pure form.

This invention also relates to the production of a number of N-tertiary amino carboxylic acids which are new chemical compounds. These are obtained by the above-mentioned process which will be more fully described hereinafter.

An object of this invention is to provide a novel and easily conducted process for the production of N-dialkyl amino carboxylic acids which employs relatively inexpensive starting materials and gives high yields of products of good quality.

Another object of this invention is to provide a process for the preparation of pure dialkyl amino carboxylic acids from commercial binary mixtures of secondary and tertiary aliphatic amines which are cheaply obtainable through the reaction of aliphatic alcohols with ammonia.

A further object of this invention is to provide, while preparing a pure dialkyl amino carboxylic acid, a novel method for the separation of a binary mixture of a dialkyl amine and a trialkyl amine into its components.

A still further object is the production of a number of new and valuable chemical compounds. More specifically, the invention involves the production of the following new compounds:

| Name | Formula |
|---|---|
| (1) N-di-n-butyl amino acetic acid | $(C_4H_9)_2N-CH_2COOH$ |
| (2) N-di-amyl amino acetic acid | $(C_5H_{11})_2N-CH_2COOH$ |
| (3) N-alpha-di-n-butyl amino propionic acid | $(C_4H_9)_2N-CH-COOH$ <br> $\quad\quad\quad\quad\quad\quad\quad\quad CH_3$ |
| (4) N-beta-di-n-butyl amino propionic acid | $(C_4H_9)_2N-CH_2CH_2COOH$ |

These objects are accomplished by the following invention which comprises reacting under non-aqueous conditions halogen substituted acyclic carboxylic acids with anhydrous secondary aliphatic amines alone or in admixture with tertiary aliphatic amines. There is obtained when using a halogen substituted carboxylic acid and a mixture of anhydrous secondary and tertiary aliphatic amines for reaction as above: (I) a dialkyl amino carboxylic acid fixed as the salt of a dialkyl amine, (II) a dialkyl amine hydrohalide, and (III) unreacted trialkyl amine. (I) and (II) are precipitated out as a semi-crystalline solid while (III) separates out as an oil layer. The anhydrous trialkyl amine (separated from dialkyl amine by the condensation) can be isolated by decantation or distillation procedures. The fixed dialkyl amine salts (I) and (II) are reacted with aqueous alkali to liberate a purified dialkyl amine (containing relatively negligible quantities of trialkyl amine) which can be recovered by distillation. The residual mass contains the sodium salt of the desired dialkyl amino carboxylic acid and a sodium halide. If desired, these can be separated by crystallization methods. The following equations represent the reactions involved in this procedure.

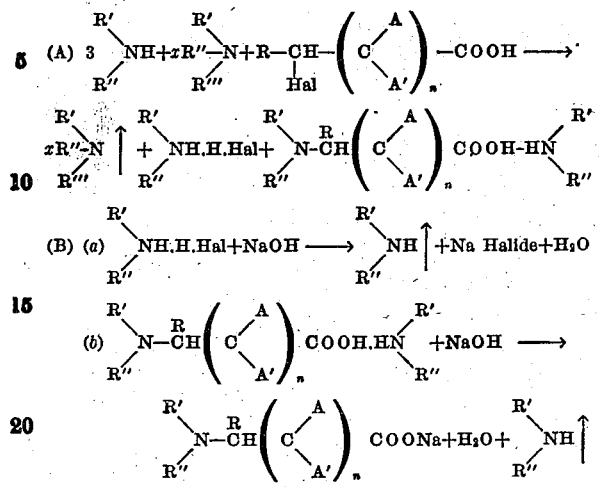

The following examples in which parts are given by weight illustrate but do not limit the invention.

EXAMPLE 1

N-dimethyl glycine

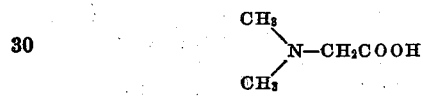

A mixture of dimethyl amine and trimethyl amine of "binary" composition which analyzes 61.7% dimethyl amine, 37.5% trimethyl amine and 0.78% monomethyl amine can be reacted with chloro-acetic acid to form sodium dimethyl glycinate while effecting a separation of trimethyl amine from dimethyl amine.

480 parts of a binary mixture containing 297 parts of dimethtyl amine and 180 parts of trimethyl amine are cooled to $-10°$ C. While agitating, the 190 parts of chloro-acetic acid are added thereto in small portions over a period of 3 to 4 hours while keeping the temperature at $-7.5°$ to $-10°$ C. by external cooling. At the completion of the reaction, which requires from 1 to 2 hours, there is observed upon settling a two layer system, namely a clear upper layer, and a thick semi-solid crystalline lower layer. The clear upper layer is practically pure trimethyl amine which can be separated by decantation, filtration, or distillation methods. The separated product boils at 3.7°–4° C. and analyzes 99.25% as trimethyl amine. When mixed with acetic acid and acetic anhydride, the mixture shows no heat rise indicating the absence of dimethyl amine.

160 parts of sodium hydroxide dissolved in 500 parts of water are used to causticize the residual crystalline mass which consists of dimethyl amine hydrochloride and the dimethyl amine salt of dimethyl glycine. The reaction with alkali liberates dimethyl amine as a vapor which can be absorbed in water or condensed to yield an anhydrous product which boils at 7° C. and which analyzes 92–93% dimethyl amine, 0.25–0.5% monomethyl amine, and 5–6% of trimethyl amine.

The reactions involved in the above procedure may be illustrated by the following equations.

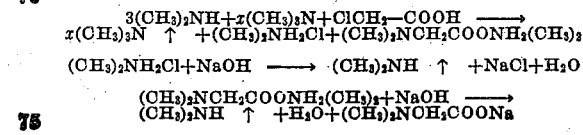

The residual still liquors contain sodium dimethyl glycinate and sodium chloride. For many purposes where the presence of salt and water is not harmful, the solution obtained as above can be used without any further purification. If pure sodium dimethyl glycinate is desired, after removal of water by evaporation, the salt may be eliminated by repeated recrystallization from ethyl alcohol. For example, 1 part of a mixture containing 60% sodium dimethyl glycinate and 33% sodium chloride, as normally obtained by evaporation of the reaction mixture, when recrystallized twice from 4 to 5 parts of 90% ethyl alcohol to eliminate insoluble sodium chloride, yields practically pure sodium dimethyl glycinate.

Analysis

|  | Found | Calculated for $C_4H_8O_2NNa$ |
|---|---|---|
| Percent nitrogen | 11.0 | 11.2 |
| Percent NaCl | 0.6 | 0.0 |

For most practical uses, the dimethtyl glycine can be employed as the sodium salt. If, however, the free amino acid is desired, it can be readily obtained by dissolving the sodium salt in hot absolute ethyl or methyl alcohol followed by careful acidification with a weighed theoretical quantity of hydrochloric acid as gas or concentrated solution. This precipitates sodium chloride and leaves dimethyl glycine dissolved in the alcohol. Evaporation of the alcoholic solution results in the desired dimethyl glycine as the free amino acid.

The dimethyl glycine can also be isolated as the hydrochloride by treatment of the condensation mass with barium hydroxide, evaporation to small volume, and precipitation through addition of alcohol and concentrated hydrochloric acid.

Analysis

|  | Found | Calculated for $C_4H_{10}O_2NCl$ |
|---|---|---|
| Percent chlorine | 25.3 | 25.4 |
| Percent nitrogen | 10.0 | 9.96 |
| Melting range, °C | 192–194 |  |

Pure anhydrous dimethyl amine may be used in place of the anhydrous binary mixture of dimethyl amine and trimethyl amine in the reaction described in this example.

The above-described reaction is not confined only to chloro-acetic acid. Other halogeno substituted acetic acids such as iodo-, bromo-, or fluoro-acetic acid may be employed. The following example indicates the reaction of iodo-acetic acid (ICH2COOH) and anhydrous dimethyl amine.

EXAMPLE 2

68 parts of anhydrous dimethyl amine are cooled to $-40°$ C., 28 parts of iodo-acetic acid are added in from 1 to 2 hours while stirring and maintaining the temperature below $-20°$ C. As the reaction proceeds, the reaction mass thickens to a flour-like viscous paste. The reaction mass is slowly allowed to warm up to room temperature while distilling out unreacted dimethyl amine which can be collected in an anhydrous condition suitable for re-use. Sodium dimethyl glycinate is obtained along with sodium iodide through treatment with caustic soda, as described in Example 1. To obtain pure sodium dimethyl glycinate, the sodium iodide can be removed from the dried crude product either by extraction with or recrystallization from 90-95% ethyl alcohol.

The reaction is general in that it can be applied to alpha halogen substituted homologues of acetic acid. Examples 3, 4, and 5 illustrate the application with reference to anhydrous dimethyl amine and alpha halogen substituted propionic, butyric, and stearic acids.

EXAMPLE 3

*Alpha N-dimethyl amino propionic acid*

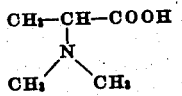

100 parts of anhydrous dimethyl amine are condensed at —5° C. to 0° C. with 33 parts of alpha chloropropionic acid ($CH_3CHClCOOH$). The excess of anhydrous dimethyl amine is recovered by distillation procedure. Dilution with 100 parts of water and alkalization with 24 parts of caustic soda (NaOH) dissolved in 36 parts of water liberates the fixed dimethyl amine. The aqueous solution upon evaporation to dryness yields 60.5 parts (100% of theory) of a mixture of 18 parts of sodium chloride and 42.5 parts of the sodium salt of alpha dimethyl amino propionic acid. This mixture can be separated by extraction with absolute ethyl alcohol, which leaves sodium chloride undissolved. The purified sodium salt of alpha dimethyl amino propionic acid is obtained upon evaporation of the alcohol solution. It can also be precipitated from the alcohol solution by addition of 6–7 volumes of acetone. In this manner, there is obtained in good yield the colorless sodium salt which is soluble in water and ethyl alcohol but insoluble in acetone, benzene, or ligroin.

*Analysis*

| | Found | Calculated for $C_5H_{10}O_2NNa$ |
| --- | --- | --- |
| Percent nitrogen | 9.71 | 10.06 |
| Percent chlorine | 0.59 | 0.00 |

EXAMPLE 4

*Alpha N-dimethyl amino butyric acid*

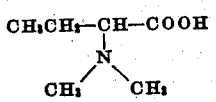

100 parts of anhydrous dimethyl amine are stirred at —5° to 0° C. with 51 parts of alpha bromo-butyric acid. The reaction is complete in from 1 to 1½ hours. By treatment with enough caustic soda to liberate the fixed amine and to form the sodium salt of the carboxylic acid, there is obtained upon evaporation, a solid mixture of sodium bromide and the sodium salt of alpha N-dimethyl amino butyric acid. Precipitation from an ethyl alcohol solution with acetone, as described in Example 3, yields an essentially pure sodium salt of alpha N-dimethyl amino butyric acid.

*Analysis*

| | Found | Calculated for $C_6H_{12}O_2NNa$ |
| --- | --- | --- |
| Percent nitrogen | 8.98 | 9.15 |
| Percent bromine | 0.15 | 0.00 |

EXAMPLE 5

*Alpha N-dimethyl amino stearic acid*

135 parts of anhydrous dimethyl amine are cooled to —10° C., 88 parts of commercial brominated triple press stearic acid (which is a mixture of 40% palmitic acid and 60% stearic acid whose average molecular weight is 349) are added in small portions while stirring. After from ½ to 1 hour, the reaction mass is allowed to warm up to room temperature while distilling out the excess of anhydrous amine. The reaction mass is finally heated on the steam bath until it becomes crystalline. The crystals are then dissolved in 250 parts of hot methyl alcohol, and cooled to crystallize out the desired dimethyl amino stearic acid. This may be collected on a filter. The alcoholic filtrate contains dimethyl amine hydrobromide. The dimethyl amino stearic acid thus obtained melts at 136°–137° C. and analyzes as follows:

| | Percent N | Percent Br | Neutralization equivalent mg. of KOH/gm. |
| --- | --- | --- | --- |
| Found | 4.47 | 0.14 | 175.4 |
| Calculated (for an average molecular weight of 313) | 4.43 | 0.00 | 179 |

In addition to halogenated stearic acid, other long chain halogenated fatty acids may be employed such as those obtained from coconut oil and palm kernel oil.

The invention here described is not confined only to the reaction of anhydrous dimethyl amine with alpha halogen substituted acyclic carboxylic acids, since homologues of dimethyl amine such as diethyl amine, dipropyl amine, dibutyl amine, and diamyl amine can also be successfully employed, as will be shown in Examples 6 to 12.

EXAMPLE 6

*N-diethyl-glycine*
$(C_2H_5)_2N—CH_2COOH$

This product is easily obtained by the reaction of anhydrous diethyl amine and bromo-acetic acid ($Br—CH_2COOH$). 100 parts of anhydrous diethyl amine are cooled to 10° C. 21 parts of bromo-acetic acid are added slowly with stirring while holding the temperature under 15° C. Subsequent treatment with water and 12 parts of caustic soda liberates the fixed diethyl amine and leaves in aqueous solution sodium bromide and sodium diethyl glycinate. The purified sodium salt is readily isolated by procedure such as that described in Examples 3 and 4. The analysis given below indicates the quality of product which is readily obtainable in one crystallization from an alcohol and acetone mixture.

*Analysis*

| | Found | Calculated for $C_6H_{12}O_2NNa$ |
| --- | --- | --- |
| Percent nitrogen | 8.66 | 9.15 |
| Percent bromine | 1.92 | 0.00 |

EXAMPLE 7

*N-di-n-propyl glycine*

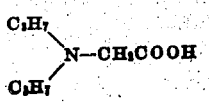

Similarly anhydrous di-n-propyl amine is reacted with chloro-acetic acid to yield N-di-n-propyl glycine. 60 parts of di-n-propyl mine are condensed at 5°–10° C. with 16 parts of chloro-acetic acid. Treatment with 12 parts of sodium hydroxide in aqueous solution yields a mixture of sodium chloride and sodium N-di-n-propyl glycinate. Purification to obtain the pure sodium salt, the free acid, or the hydrochloride can be effected as described in the previous examples.

EXAMPLE 8

Alpha N-di-n-butyl amino propionic acid

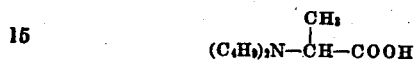

80 parts of di-n-butyl amine are heated for 8 hours at 100° C. with 19.5 parts of alpha bromo-propionic acid. After treatment with 12 parts of sodium hydroxide and recovery of unreacted di-n-butyl amine by distillation in vacuum, there is obtained upon extraction with diethyl ether, an ether solution of alpha N-di-n-butyl amino sodium propionate. Evaporation to dryness yields 20 parts of technically pure product (95.2% purity).

Analysis

|  | Found | Calculated for $C_{11}H_{22}O_2NNa$ |
|---|---|---|
| Percent nitrogen | 5.98 | 6.28 |
| Percent bromine | 1.37 | 0.00 |

If desired, the product may be further freed from sodium bromide by repeated recrystallizations from diethyl ether or ligroin.

EXAMPLE 9

N-di-n-butyl glycine
$(C_4H_9)_2N-CH_2COOH$ 160 parts of di-n-butyl amine are reacted at 35°–40° C. with 30 parts of chloro-acetic acid. When fully reacted after from 3 to 4 hours of stirring, the mass is diluted with 100 parts of water in which have been dissolved 24 parts of caustic soda. The mass is then distilled with water at constant volume to recover unreacted dibutyl amine. The aqueous solution left in the still is clarified by boiling with activated charcoal followed by filtration through Florida Earth or diatomaceous earth. Evaporation to dryness results in a mixture of sodium chloride and sodium dibutyl glycinate. The sodium dibutyl glycinate can be separated from sodium chloride through solution in cold absolute ethyl alcohol. Addition of from 7 to 10 volumes of acetone reprecipitates the sodium dibutyl glycinate as a colorless milklike product, which is 95.5% pure when dried.

Analysis

|  | Found | Calculated for $C_{10}H_{20}O_2NNa$ |
|---|---|---|
| Percent nitrogen | 6.38 | 6.68 |
| Percent chlorine | 0.48 | 0.00 |

EXAMPLE 10

The above-described N-dibutyl glycine can also be prepared from a mixture of dibutyl amine and tributyl amine through reaction at 15°–25° C. with chloro-acetic acid. The results are similar to those obtained in Example 1 where a mixture of dimethyl amine and trimethyl amine was employed. The tributyl amine does not readily react, while the amine which is fixed as salts and the base liberated by caustic soda treatment is essentially pure dibutyl amine.

Analysis of dibutyl amine recovered

|  | Found | Calculated for $(C_4H_9)_2NH$ |
|---|---|---|
| Percent nitrogen | 10.37 | 10.85 |
| Boiling range, °C | 160–162 | 160 |

A quantitive yield of the sodium salt of N-di-n-butyl glycine is obtained.

EXAMPLE 11

N-diamyl glycine
$(C_5H_{11})_2N-CH_2COOH$ 157 parts of diamyl amine are heated from 3 to 4 hours at 55°–80° C. with 30 parts of chloroacetic acid. Treatment with caustic soda solution liberates uncondensed amine, which may be recovered by distillation procedures. Further evaporation in vacuum yields as solid the desired sodium N-diamyl glycinate in admixture with sodium chloride. Purification of this sodium salt by solution in organic solvents can be effected as described in the previous examples. The hydrochloride is readily obtained through the addition of dry gaseous hydrogen chloride to a solution of the sodium diamyl glycinate in absolute ethyl alcohol. The hydrochloride of diamyl glycine is extremely soluble in water, acetone, and alcohol. It is insoluble in diethyl ether and ligroin.

Examples 1 to 11 have illustrated the condensation of secondary aliphatic amines with alpha halogen substituted acyclic carboxylic acids. This invention, however, is not restricted to reaction with alpha halogen substituted acids only, since beta and gamma halogen substituted acids can also be condensed with secondary aliphatic amines, as will be shown by the next two examples.

EXAMPLE 12

Beta N-di-n-butyl amino propionic acid
$(C_4H_9)_2N-CH_2CH_2COOH$ 30.5 parts of beta bromo-propionic acid ($BrCH_2CH_2COOH$) are added in small portions with stirring to 100 parts of di-n-butyl amine. The temperature rises from 20° C. to 40° C. during the addition. After from 1 to 2 hours, the mass is heated to 60° C. and held for 6–7 hours until the reaction is complete. The test for completion is made as follows: A sample of the reaction mass is dissolved in cold water. Inorganic bromides which have been formed are completely precipitated through addition of cold nitric acid and silver nitrate solution. The clear filtrate (from which silver bromide has been precipitated in the cold) should, upon boiling with more nitric acid and silver nitrate solution, give no further silver bromide precipitation.

Treatment of the finished condensation mass with caustic soda, as described in previous examples, yields, after removal of liberated amine, a mixture of sodium bromide and sodium beta dibutyl amino propionate in aqueous solution. For purposes of economy, bromine may be distilled and recovered from this solution by treatment with mild oxidizing agents such as alkali hypochlorites, alkali bromates or hydrogen peroxide. The residual sodium beta dibutyl amino propionate can be isolated by evaporation. If desired, the product so obtained can be freed from inorganic salts through solution in alcohol or acetone.

EXAMPLE 13

*Beta N-di-methyl amino propionic acid*

$(CH_3)_2N-CH_2CH_2COOH$ 60 parts of beta iodo-propionic acid ($ICH_2CH_2COOH$) are added while stirring in small portions to 100 parts of anhydrous dimethyl amine whose temperature is maintained at $-15°$ to $-10°$ C. Treatment with 24 parts of sodium hydroxide in aqueous solution, and evaporation to dryness gives a quantitative yield of sodium iodide, and the sodium salt of dimethyl amino propionic acid. The sodium salt of dimethyl amino propionic acid is soluble in ethyl alcohol, acetone, and water. It is insoluble in hydrocarbons such as benzene, toluene or xylene.

Although specific examples have been given, this invention is not limited to them alone, since modifications may be made by those skilled in the art without departing from the scope of this invention. The temperatures and pressures required for the condensations described in the above examples may be varied over a considerable range without seriously affecting the final result. For example, it may be of advantage, in order to eliminate excessive refrigeration costs when condensing chloro-acetic acid with dimethyl amine or any other low boiling amines, to operate under superatmospheric conditions; i. e., 5-10 atmospheres at relatively elevated temperatures (55–100° C.).

Variations in the proportions of the reactants used, and in the mode of mixing of the reactants can also be made.

The separation of secondary and tertiary aliphatic amines by reaction with a halogen substituted carboxylic acid is not general. It is operable only for the lower homologues; i. e., methyl to butyl amines inclusive. A mixture of diamyl amine and triamyl amine is not suitably separated in this manner.

The sodium salts of N-tertiary amino acyclic carboxylic acids, as for example sodium dimethyl glycinate

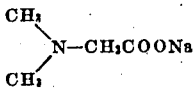

and its homologues, have been used for selective removal of hydrogen sulfide from coke oven gases. N-tertiary amino acyclic carboxylic acids have recently been found useful as intermediates in the manufacture of new detergents such as the betaines, which contain a long chain alkyl group.

This invention covers an improved process for the production of these valuable dialkyl amino carboxylic acids which does not employ bulky aqueous solutions of dialkyl amines and which does not require the use of relatively expensive esters of halogen substituted carboxylic acids. This invention is also of advantage because it embodies a procedure for the preparation of pure dialkyl amino carboxylic acids from commercial mixtures of secondary and tertiary aliphatic amines while separating these amines in purified form.

The above description and examples are intended to be illustrative only and not to limit the scope of the invention. Any departure therefrom which conforms to the spirit of the invention is intended to be included within the scope of the appended claims.

We claim:

1. A process for the preparation of the sodium salt of N-dimethyl glycine which comprises reacting an undiluted anhydrous binary mixture of dimethyl amine and trimethyl amine with chloro-acetic acid at about $-10°$ C., separating trimethyl amine which does not participate in the reaction from the dimethyl amine salts which are formed, reacting the dimethyl amine salts with an aqueous solution of sodium hydroxide to liberate dimethyl amine as a gas and form sodium chloride and the sodium salt of N-dimethyl glycine in water solution, evaporating this solution to dryness, and separating the sodium salt of N-dimethyl glycine from sodium chloride by treatment with 90% ethyl alcohol to eliminate insoluble sodium chloride.

2. In a process of preparing an N-dialkyl-amino aliphatic monocarboxylic acid, the step which comprises reacting an anhydrous dialkyl amine wherein the alkyl groups each contain from 1 to 5 carbon atoms with a mono-halogen substituted aliphatic monocarboxylic acid which contains from 2 to 4 carbon atoms under non-aqueous conditions and in the absence of organic solvents.

3. In a process of preparing an N-dialkyl glycine, the step which comprises reacting an anhydrous dialkyl amine wherein the alkyl groups each contain from 1 to 5 carbon atoms with chloro-acetic acid under non-aqueous conditions and in the absence of organic solvents.

4. A process of separating trimethyl amine from an undiluted anhydrous binary mixture of dimethyl amine and trimethyl amine which comprises reacting said binary mixture with chloro-acetic acid and removing the trimethyl amine which does not enter into the reaction.

5. In a process of producing an N-dialkyl amino acyclic carboxylic acid of the general formula:

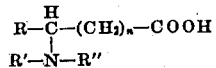

wherein R represents a member of the group consisting of hydrogen and alkyl radicals having from 1 to 20 carbon atoms, R' and R'' stand for alkyl radicals containing from 1 to 5 carbon atoms, and $n$ denotes 0, 1, or 2; the step which comprises condensing in the absence of water and organic solvents an anhydrous dialkyl amine wherein the alkyl groups each contain from 1 to 5 carbon atoms with a halogen substituted acyclic carboxylic acid of the general formula:

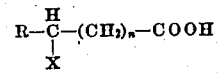

wherein X stands for a halogen atom, R represents a member of the group consisting of hydrogen and alkyl radicals having from 1 to 20 carbon atoms, and $n$ denotes 0, 1, or 2.

6. N-diamyl amino acetic acid.

7. A process of making N-dimethyl glycine which comprises condensing an undiluted anhydrous binary mixture of dimethyl amine and trimethyl amine with chloro-acetic acid, separating the trimethyl amine which does not participate in the reaction, alkalizing the residual crystalline mass, which contains dimethyl amine hydrochloride and the dimethyl amine salt of N-dimethyl glycine, with an alkali metal hydroxide to obtain an alkali metal salt of N-dimethyl glycine, dissolving the alkali metal salt of N-dimethyl glycine in hot absolute ethyl alcohol, acidifying said alcohol solution with hydrochloric acid, and separating the alkali metal chloride which precipitates upon acidification from the alcohol solution of N-dimethyl glycine.

8. In a process of preparing N-dimethyl glycine, the steps which comprise condensing a mono halogeno substituted acetic acid with anhydrous dimethyl amine at a temperature below 0° C. in the absence of water and organic solvents, and converting the dimethyl amine salt of N-dimethyl glycine which is thereby obtained to an alkali metal salt of N-dimethyl glycine by reaction with an alkali metal hydroxide.

9. In a process of manufacturing an alpha N-dimethyl amino monocarboxylic acid which contains from 4 to 6 carbon atoms, the steps which comprise condensing anhydrous dimethyl amine with an alpha halogen substituted monocarboxylic acid which contains from 2 to 4 carbon atoms in the absence of water and organic solvents, and converting the dimethyl amine salt of the N-dimethyl amino monocarboxylic acid which is thereby obtained to an alkali metal salt of an alpha N-dimethyl amino monocarboxylic acid by reaction with an alkali metal hydroxide.

10. In a process of preparing an N-dialkyl glycine wherein each of the alkyl groups contains from 1 to 5 carbon atoms, the steps which comprise condensing a mono halogeno substituted acetic acid with an anhydrous dialkyl amine in which each of the alkyl groups contains from 1 to 5 carbon atoms in the absence of water and organic solvents, and converting the dialkyl amine salt of an N-dialkyl glycine which is thereby obtained to an alkali metal salt of an N-dialkyl glycine by reaction with an alkali metal hydroxide.

11. In a process of preparing an N-dialkyl amino monocarboxylic acid in which each of the alkyl groups contains from 1 to 5 carbon atoms and the monocarboxylic acid radical contains from 2 to 4 carbon atoms, the steps which comprise condensing an anhydrous dialkyl amine wherein each of the alkyl groups contains from 1 to 5 carbon atoms with a mono halogen substituted monocarboxylic acid which contains from 2 to 4 carbon atoms in the absence of water and organic solvents, and converting the dialkyl amine salt of an N-dialkyl amino monocarboxylic acid which is thereby obtained to an alkali metal salt of an N-dialkyl amino monocarboxylic acid by reaction with an alkali metal hydroxide.

12. A process for the preparation of the sodium salt of N-dimethyl glycine which comprises condensing mono chloro-acetic acid with anhydrous dimethyl amine in the absence of water and organic solvents, and converting the dimethyl amine salt of N-dimethyl glycine which is thereby obtained to the sodium salt of N-dimethyl glycine by reaction with sodium hydroxide.

13. In a process for preparing N-dibutyl glycine, the steps which comprise condensing anhydrous di-n-butyl amine with chloro-acetic acid in the absence of water and organic solvents, and converting the dibutyl amine salt of N-dibutyl glycine which is thereby obtained to the sodium salt of N-dibutyl glycine by reaction with sodium hydroxide.

14. In a process for preparing N-diamyl glycine, the steps which comprise condensing anhydrous diamyl amine with chloro-acetic acid in the absence of water and organic solvents, and converting the diamyl amine salt of N-diamyl glycine which is thereby obtained to the sodium salt of N-diamyl glycine by reaction with sodium hydroxide.

WILLIAM STANSFIELD CALCOTT.
LOUIS SPIEGLER.
JOHN MARLIN TINKER.